United States Patent
Czompo et al.

(10) Patent No.: US 8,914,037 B2
(45) Date of Patent: Dec. 16, 2014

(54) NUMERICALLY STABLE COMPUTATION OF HEADING WITHOUT A REFERENCE AXIS

(75) Inventors: Joseph Czompo, Santa Clara, CA (US); Victor Kulik, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 728 days.

(21) Appl. No.: 13/208,285

(22) Filed: Aug. 11, 2011

(65) Prior Publication Data
US 2013/0040653 A1  Feb. 14, 2013

(51) Int. Cl.
*H04W 24/00* (2009.01)
*G01C 21/16* (2006.01)

(52) U.S. Cl.
CPC .................................. *G01C 21/165* (2013.01)
USPC ....................................... 455/456.1; 342/202

(58) Field of Classification Search
CPC ..... H04W 4/02; G01S 7/282; H04L 29/08108
USPC .................. 455/456.1, 414.1, 556.1; 342/202
See application file for complete search history.

(56) References Cited

U.S. PATENT DOCUMENTS

| | | | |
|---|---|---|---|
| 4,637,402 A | 1/1987 | Adelman | |
| 5,617,317 A | 4/1997 | Ignagni | |
| 6,813,582 B2 | 11/2004 | Levi et al. | |
| 7,299,034 B2 | 11/2007 | Kates | |
| 7,487,670 B2 | 2/2009 | Fink et al. | |
| 2002/0021245 A1 | 2/2002 | Lin et al. | |
| 2002/0158805 A1 | 10/2002 | Turnbull et al. | |
| 2002/0165910 A1 | 11/2002 | Brown et al. | |
| 2003/0018430 A1 | 1/2003 | Ladetto et al. | |
| 2003/0191582 A1 | 10/2003 | Terada | |
| 2004/0147244 A1 | 7/2004 | Raisanen | |

(Continued)

FOREIGN PATENT DOCUMENTS

| EP | 1994883 A1 | 11/2008 |
|---|---|---|
| FR | 2914739 A1 | 10/2008 |

(Continued)

OTHER PUBLICATIONS

International Search Report and Written Opinion—PCT/US2012/049370—ISA/EPO—Nov. 9, 2012.

(Continued)

*Primary Examiner* — Phuoc H Doan
(74) *Attorney, Agent, or Firm* — Kilpatrick Townsend & Stockton LLP

(57) ABSTRACT

Systems and methods are described for computing device motion direction and orientation. A system as described herein includes an orientation sensor configured to collect data relating to orientation of the mobile device; an orientation analysis module communicatively coupled to the orientation sensor and configured to determine a three-dimensional orientation of the mobile device relative to an Earth-based coordinate system based on the data collected by the orientation sensor; and a motion direction tracker module communicatively coupled to the orientation analysis module, configured to compute a first direction, that is a three-dimensional direction of motion of the mobile device relative to a coordinate system of the mobile device, and configured to compute a second direction, that is a direction of motion of the mobile device relative to the Earth-based coordinate system, based on the first direction using the three-dimensional orientation of the mobile device relative to the Earth-based coordinate system.

26 Claims, 7 Drawing Sheets

(56) References Cited

U.S. PATENT DOCUMENTS

| | | | |
|---|---|---|---|
| 2005/0033200 | A1 | 2/2005 | Soehren et al. |
| 2008/0201033 | A1 | 8/2008 | DeMersseman et al. |
| 2008/0255800 | A1 | 10/2008 | Meriheina et al. |
| 2008/0281555 | A1 | 11/2008 | Godin et al. |
| 2009/0054077 | A1 | 2/2009 | Gauthier et al. |
| 2009/0239586 | A1 | 9/2009 | Boeve et al. |
| 2009/0292495 | A1 | 11/2009 | Navarro, Jr. et al. |
| 2010/0045667 | A1 | 2/2010 | Kornmann et al. |
| 2010/0130125 | A1 | 5/2010 | Nurmi |
| 2010/0130229 | A1 | 5/2010 | Sridhara et al. |
| 2010/0273461 | A1* | 10/2010 | Choi ............... 455/414.1 |
| 2011/0125404 | A1 | 5/2011 | Czompo |
| 2012/0086438 | A1* | 4/2012 | Tu ..................... 324/202 |
| 2012/0296603 | A1 | 11/2012 | Kulik et al. |
| 2013/0046505 | A1 | 2/2013 | Brunner et al. |

FOREIGN PATENT DOCUMENTS

| | | |
|---|---|---|
| FR | 2937423 A1 | 4/2010 |
| JP | 2005114537 A | 4/2005 |
| JP | 2006175206 A | 7/2006 |

OTHER PUBLICATIONS

Hoseinitabatabaei S.A., et al., "uDirect: A novel approach for pervasive observation of user direction with mobile phones", Pervasive Computing and Communications (PERCOM), 2011 IEEE International Conference on, IEEE, Mar. 21, 2011, pp. 74-83, XP031868417.

Kunze, et al., "Which way am I facing: Inferring horizontal device orientation from an accelerometer signal," 2009 International Symposium on Wearable Computers, ISWC '09, pp. 149-150.

Kunze, K., et al., "Where am I: Recognizing On-body Positions of Wearable Sensors", Lecture Notes in Computer Science vol. 3479, Jan. 1, 2005, XP55041023, LoCA 2005 DOI: 10.1007/1 1426646-25 ISBN : 978-3-54-025896-4, pp. 264-275.

Kupper, et al., "TraX: A Device-Centric Middleware Framework for Location-Based Services," IEEE Communications Magazine, vol. 44, No. 9, pp. 114-120.

Kurata T., et al., "Personal positioning based on walking locomotion analysis with self-contained sensors and a wearable camera", Proceedings of the Second IEEE and ACM International Symposium on Mixed and Augmented Reality, Oct. 7, 2003, Oct. 10, 2003, pp. 103-112.

Murray-Smith, et al., "Gait alignment in mobile phone conversations", MobileHCI '07 Proceedings of the 9th international conference on Human computer interaction with mobile devices and services, 2007, 8 pages.

Steinhoff U., et al., "Dead reckoning from the pocket—An experimental study", Pervasive Computing and Communications (PERCOM), 2010 IEEE International Conference on, IEEE, Piscataway, NJ, USA, Mar. 29, 2010, pp. 162-170, XP031677610.

* cited by examiner

NUMERICALLY STABLE COMPUTATION OF HEADING WITHOUT A REFERENCE AXIS

BACKGROUND

Wireless communication devices are incredibly widespread in today's society. For example, people use cellular phones, smart phones, personal digital assistants, laptop computers, pagers, tablet computers, etc. to send and receive data wirelessly from countless locations. Moreover, advancements in wireless communication technology have greatly increased the versatility of today's wireless communication devices, enabling users to perform a wide range of tasks from a single, portable device that conventionally required either multiple devices or larger, non-portable equipment.

Various mobile device applications, such as navigation aids, business directories, local news and weather services, or the like, leverage knowledge of the position of the device. In various cases, the position of a mobile device is identified via motion tracking with respect to the device. In one currently employed technique, device motion is represented as a vector in order to enable motion tracking by continuously monitoring the heading of the vector. The orientation of a motion vector relative to its corresponding device is assumed constant and obtained via calibration and/or other initial measurements. Subsequently, changes to the orientation of the device with respect to the earth are tracked, in turn enabling continuous tracking of the heading of the motion vector.

In techniques such as that described above, a reference axis is inherently involved in the heading computation. More particularly, the heading is composed of two components: the direction of a reference axis of a coordinate frame of the device with respect to the earth, and the relative angle between the projection of the reference axis onto the horizontal plane with respect to the earth and the direction of motion. However, as the reference axis approaches vertical, inaccuracies occur and, in the case of a fully vertical reference axis, a numerical singularity and computational failure occur. One currently employed technique replaces the reference axis with another axis when the original reference axis approaches vertical, thereby mitigating the effects of a numerical singularity at the cost of higher computational complexity.

SUMMARY

A system for computing motion direction of a mobile device as described herein includes an orientation sensor configured to collect data relating to orientation of the mobile device, an orientation analysis module communicatively coupled to the orientation sensor and configured to determine a three-dimensional orientation of the mobile device relative to an Earth-based coordinate system based on the data collected by the orientation sensor, and a motion direction tracker module communicatively coupled to the orientation analysis module and configured to compute a first direction, that is a three-dimensional direction of motion of the mobile device relative to a coordinate system of the mobile device, and to compute a second direction, that is a direction of motion of the mobile device relative to the Earth-based coordinate system, based on the first direction using the three-dimensional orientation of the mobile device relative to the Earth-based coordinate system.

Implementations of the system can include one or more of the following features. The orientation sensor includes at least one of an accelerometer, a gyroscope or a magnetometer. The orientation sensor is further configured to collect data relating to motion direction of the mobile device and the motion direction tracker module is further configured to determine the first direction based on the data collected by the orientation sensor relating to the motion direction of the mobile device. The motion direction tracker module is further configured to relate the coordinate system of the mobile device to the Earth-based coordinate system and to translate the motion direction of the device of the mobile device from the coordinate system of the mobile device to the Earth-based coordinate system. The motion direction tracker module is further configured to relate the coordinate system of the mobile device to the Earth-based coordinate system using a rotation matrix or a quaternion. The first direction is an angle relative to north in relation to a horizontal plane of the Earth-based coordinate system. The first direction is one of an angle relative to magnetic north or an angle relative to true north. The motion direction tracker module is further configured to compute the second direction by projecting, to a horizontal plane at Earth's surface, a three-dimensional direction of motion of the mobile device relative to the Earth-based coordinate system determined using a three-dimensional direction of motion of the mobile device relative to a coordinate system of the mobile device and the three-dimensional orientation of the mobile device relative to the Earth-based coordinate system.

A system for tracking motion direction of a mobile device as described herein includes an orientation sensor configured to collect data relating to orientation of the mobile device, a satellite positioning system (SPS) receiver configured to determine an initial direction of motion of the mobile device in terms of an Earth-based coordinate system during a calibration time period, an orientation analysis module communicatively coupled to the orientation sensor and configured to track changes to a three-dimensional orientation of the mobile device in terms of the Earth-based coordinate system over time based on the data collected by the orientation sensor, and a motion direction tracker module communicatively coupled to the SPS receiver and the orientation analysis module and configured to compute the direction of motion of the mobile device in terms of the Earth-based coordinate system relative to the initial direction of motion of the mobile device using the changes to the three-dimensional orientation of the mobile device in terms of the Earth-based coordinate system.

Implementations of the system can include one or more of the following features. The orientation sensor includes at least one of an accelerometer, a gyroscope or a magnetometer. The motion direction tracker module is further configured to compute the direction of motion of the mobile device as an angle relative to north in relation to a horizontal plane of the Earth-based coordinate system. The motion direction tracker module is further configured to compute the direction of motion of the mobile device by projecting, to a horizontal plane at Earth's surface, a three-dimensional direction of motion of the mobile device relative to the Earth-based coordinate system determined using a three-dimensional direction of motion of the mobile device in terms of a coordinate system of the mobile device, the changes to the three-dimensional orientation of the mobile device in terms of the Earth-based coordinate system over time, and the initial direction of motion of the mobile device in terms of the Earth-based coordinate system.

A method of computing motion direction of a mobile device as described herein includes determining a three-dimensional orientation of the mobile device relative to a coordinate system of Earth, computing a first direction, that is a three-dimensional direction of motion of the mobile device relative to a coordinate system of the mobile device, and computing a second direction, that is a direction of motion of the mobile device relative to Earth, using the first direction and the three-dimensional orientation of the mobile device relative to the coordinate system of Earth.

Implementations of the method can include one or more of the following features. Analyzing information from at least one of an accelerometer, a gyroscope or a magnetometer. The second direction is an angle relative to north. Determining a three-dimensional direction of motion of the mobile device relative to the coordinate system of Earth using the first direction and the three-dimensional orientation of the mobile device relative to the coordinate system of Earth, and projecting, to a horizontal plane at Earth's surface, the three-dimensional direction of motion of the mobile device relative to the coordinate system of Earth.

A method of tracking a motion direction of a mobile device over time as described herein includes obtaining an initial motion direction of the mobile device in a coordinate system of Earth from a satellite navigation system during an initial time period, determining a three-dimensional orientation of the mobile device in the coordinate system of Earth subsequent to the initial time period, and computing an updated motion direction of the mobile device in the coordinate system of Earth relative to the initial motion direction of the mobile device using the three-dimensional orientation of the mobile device in the coordinate system of Earth.

Implementations of the method can include one or more of the following features. Determining an initial three-dimensional orientation of the mobile device in the coordinate system of Earth during the initial time period, and computing a three-dimensional motion direction of the mobile device in a coordinate system of the mobile device using the initial motion direction of the mobile device in the coordinate system of Earth and the initial three-dimensional orientation of the mobile device in the coordinate system of Earth. Determining an updated three-dimensional motion direction of the mobile device in the coordinate system of Earth using the three-dimensional motion direction of the mobile device in the coordinate system of the mobile device and the three-dimensional orientation of the mobile device in the coordinate system of Earth subsequent to the initial time period, and projecting, to a horizontal plane at Earth's surface, the updated three-dimensional motion direction of the mobile device in the coordinate system of Earth.

A mobile wireless communication device as described herein includes sensing means for generating orientation information for the device; orientation means, communicatively coupled to the sensing means, for computing a three-dimensional earth-frame orientation of the device relative to Earth based on the orientation information for the device; and direction means, communicatively coupled to the orientation means, for computing a three-dimensional sensor-frame direction of motion of the device relative to a sensor coordinate plane of the device defined by at least one sensor axis and computing an earth-frame direction of motion of the device relative to Earth using the three-dimensional sensor-frame direction of motion of the device and the three-dimensional earth-frame orientation of the device.

Implementations of the device can include one or more of the following features. The direction means is further configured to translate the three-dimensional sensor-frame direction of motion of the device to a three-dimensional earth-frame direction of motion using a rotation matrix or a quaternion. The earth-frame direction of motion of the device is an angle relative to north and the direction means is configured to compute the earth-frame direction of motion of the device by projecting, to a horizontal plane relative to Earth, a three-dimensional earth-plane direction of motion of the device determined using a three-dimensional sensor-plane direction of motion of the device and the three-dimensional earth-plane orientation of the device.

A mobile wireless communication device as described herein includes sensing means for generating orientation information for the device; calibration means for determining an initial earth-frame direction of motion of the device relative to Earth; orientation means, communicatively coupled to the sensing means, for tracking changes to a three-dimensional earth-frame orientation of the device relative to Earth over time based on the orientation information for the device; and direction means, communicatively coupled to the calibration means and the orientation means, for computing changes to an earth-frame direction of motion of the device relative to Earth over time relative to the initial earth-frame direction of motion of the device using the changes to the three-dimensional earth-frame orientation of the device.

Implementations of the device can include one or more of the following features. The direction means is configured to compute the earth-frame direction of motion of the device as an angle relative to north. The direction means is further configured to compute the earth-frame direction of motion of the device by projecting, to a horizontal plane relative to Earth, a three-dimensional earth-frame direction of motion of the device computed using a sensor-frame direction of motion of the device relative to a sensor coordinate plane of the device defined by at least one sensor axis, the changes to the three-dimensional earth-frame orientation of the device, and the initial earth-frame direction of motion of the device.

A computer program product as described herein resides on a non-transitory processor-readable medium and includes processor-readable instructions configured to cause a processor to determine a three-dimensional orientation of a mobile device relative to a coordinate system of Earth, compute a first direction, that is a three-dimensional direction of motion of the mobile device relative to a coordinate system of the mobile device, and compute a second direction, that is a direction of motion of the mobile device relative to Earth, using the first direction and the three-dimensional orientation of the mobile device relative to the coordinate system of Earth.

Implementations of the computer program product can include one or more of the following features. The first direction is an angle relative to north. The instructions configured to cause a processor to compute the second direction are further configured to cause the processor to determine a three-dimensional direction of motion of the mobile device relative to the coordinate system of Earth using the first direction and the three-dimensional orientation of the mobile device relative to the coordinate system of Earth, and project, to a horizontal plane at Earth's surface, the three-dimensional direction of motion of the mobile device relative to the coordinate system of Earth.

A computer program product as described herein resides on a non-transitory processor-readable medium and includes processor-readable instructions configured to cause a processor to obtain an initial motion direction of a mobile device in a coordinate system of Earth from a satellite navigation system during an initial time period, determine a three-dimensional orientation of the mobile device in the coordinate system of Earth subsequent to the initial time period, and compute an updated motion direction of the mobile device in the coordinate system of Earth relative to the initial motion direction of the mobile device using the three-dimensional orientation of the mobile device in the coordinate system of Earth.

Implementations of the computer program product can include one or more of the following features. The non-transitory processor-readable medium further includes processor-readable instructions configured to cause a processor to determine an initial three-dimensional orientation of the mobile device in the coordinate system of Earth during the initial time period, and compute a three-dimensional motion direction of the mobile device in a coordinate system of the mobile device using the initial motion direction of the mobile device in the coordinate system of Earth and the initial three-dimensional orientation of the mobile device in the coordinate system of Earth. The instructions configured to cause a processor to compute an updated motion direction of the mobile device are further configured to cause the processor to determine an updated three-dimensional motion direction of the mobile device in the coordinate system of Earth using the three-dimensional motion direction of the mobile device in the coordinate system of the mobile device and the three-dimensional orientation of the mobile device in the coordinate system of Earth subsequent to the initial time period, and project, to a horizontal plane at Earth's surface, the updated three-dimensional motion direction of the mobile device in the coordinate system of Earth.

Items and/or techniques described herein may provide one or more of the following capabilities, as well as other capabilities not mentioned. Computational complexity of motion tracking with respect to a mobile device can be reduced. Heading and position measurements can be made by a mobile device with increased accuracy. As no reference axis is used, motion tracking can be performed without singularities and/or accuracy degradation associated with a reference axis. Enhanced consistency associated with motion direction monitoring for a mobile device can be achieved irrespective of the orientation of the mobile device. While at least one item/technique-effect pair has been described, it may be possible for a noted effect to be achieved by means other than that noted, and a noted item/technique may not necessarily yield the noted effect.

DETAILED DESCRIPTION

Techniques are described herein for numerically stable computation of the heading of a vector, such as that corresponding to the motion direction of a mobile device, using a sensor ensemble to track orientation changes with respect to Earth without the use of a reference axis. For example, a mobile device, such as a mobile telephone handset, a laptop or tablet computer, a PDA, etc., can collect data from a sensor ensemble composed of one or more motion and/or orientation sensors. The data obtained from the sensor ensemble are leveraged to maintain a vector that is expressed in a coordinate frame of the sensor ensemble. This sensor coordinate frame can then be determined with respect to Earth using a rotation matrix, a quaternion, etc. Subsequently, the vector maintained via the sensor data is expressed in the Earth-based coordinate frame, based on which the heading of the vector is computed. The computed heading of the vector can be used in tracking motion and/or location of the mobile device for a variety of applications. Alternatively, an indirect technique for heading computation can be utilized, wherein an initial motion direction of the mobile device is obtained, e.g., through use of global positioning system (GPS) or other satellite positioning system (SPS) information (e.g., GLONASS information), and changes to the initial motion direction are tracked in relation to changes of orientation of the mobile device. These techniques are examples only and are not limiting of the disclosure or the claims.

Figure 1:
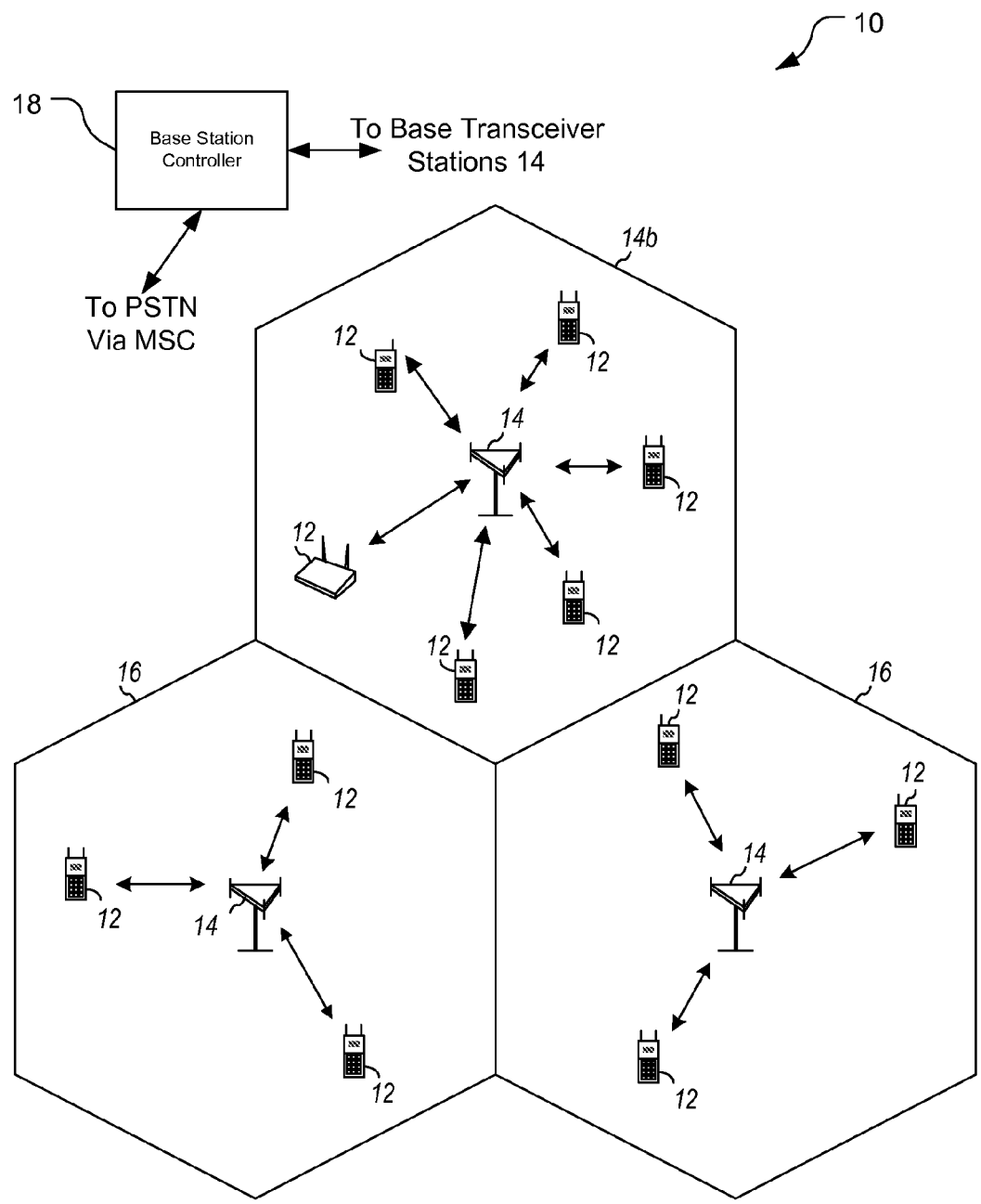
FIG. 1 is a schematic diagram of a wireless telecommunication system.

Referring to FIG. 1, a wireless communication system 10 includes mobile access terminals 12 (ATs), base transceiver stations (BTSs) 14 disposed in cells 16, and a base station controller (BSC) 18. The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 14 can wirelessly communicate with the mobile devices 12 via antennas. Each of the BTSs 14 may also be referred to as a base station, an access point, an access node (AN), a Node B, an evolved Node B (eNB), etc. The BTSs 14 are configured to communicate with the mobile devices 12 under the control of the BSC 18 via multiple carriers. Each of the BTSs 14 can provide communication coverage for a respective geographic area, here the respective cells 16. Each of the cells 16 of the BTSs 14 is partitioned into multiple sectors as a function of the base station antennas.

The system 10 may include only macro base stations 14 or it can have base stations 14 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The mobile devices 12 can be dispersed throughout the cells 16. The mobile devices 12 may be referred to as terminals, mobile stations, mobile devices, user equipment (UE), subscriber units, etc. The mobile devices 12 shown in FIG. 1 include cellular phones and a wireless router, but can also include personal digital assistants (PDAs), other handheld devices, netbooks, notebook computers, etc.

Figure 2:
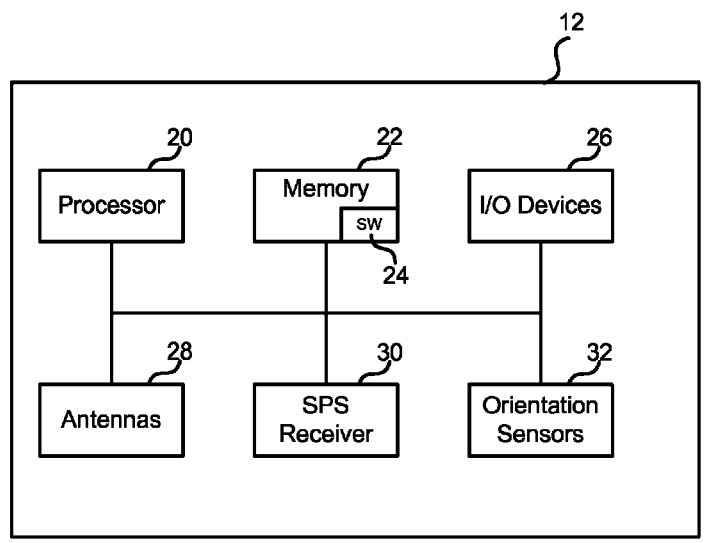
FIG. 2 is a block diagram of components of a mobile station shown in FIG. 1.

Referring also to FIG. 2, an example one of the mobile devices 12 comprises a computer system including a processor 20, memory 22 including software 24, input/output (I/O) devices 26 (e.g., a display, speaker, keypad, touch screen or touchpad, etc.), antennas 28, a SPS receiver 30, and orientation sensors 32. The antennas 28 include a transceiver configured to communicate bi-directionally with the BTSs 14 via the antennas 28. Here, the processor 20 is an intelligent hardware device, e.g., a central processing unit (CPU) such as those made by Intel® Corporation or AMD®, a microcontroller, an application specific integrated circuit (ASIC), etc. The memory 22 includes non-transitory storage media such as random access memory (RAM) and read-only memory (ROM). The memory 22 stores the software 24 which is computer-readable, computer-executable software code containing instructions that are configured to, when executed, cause the processor 20 to perform various functions described herein. Alternatively, the software 24 may not be directly executable by the processor 20 but is configured to cause the computer, e.g., when compiled and executed, to perform the functions.

The SPS receiver 30 includes appropriate equipment for monitoring navigation signals from satellites and determining position of the mobile device 12. For example, the SPS receiver 30 includes one or more SPS antennas, and can either communicate with the processor 20 to determine location information or can use its own processor for processing the received satellite navigation signals to determine the location of the mobile device 12. Further, the SPS receiver 30 can communicate with other entities such as a position determination entity and/or the BTS 14 in order to send and/or receive assistance information for use in determining the location of the mobile device 12.

Figure 3:
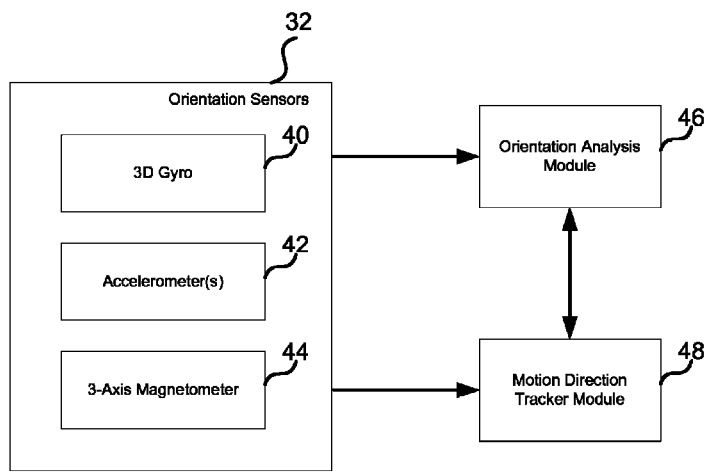
FIG. 3 is a partial functional block diagram of the mobile station shown in FIG. 2.

The orientation sensors 32 are configured to collect data relating to motion and/or orientation of the mobile device 12 as well as changes in the motion and/or orientation of the mobile device 12 over time. Referring also to FIG. 3, the orientation sensors 32 include a three-axis or three-dimensional gyroscope (gyro) 40, accelerometer(s) 42 and a three-axis magnetometer 44. The orientation sensors 32 are configured to provide information from which the motion direction and/or orientation of the mobile device 12 can be determined. The orientation sensors 32 provide data to one or more orientation analysis modules 46 to facilitate determination of the orientation of the mobile device 12 as well as to a motion direction tracker module 48 to facilitate determination and monitoring of a direction of motion of the mobile device 12, e.g., with respect to the earth.

The orientation sensors 32 can provide information over time, e.g., periodically, such that present and past orientations and/or motion directions can be compared to determine changes in the motion direction and/or orientation of the mobile device 12. The gyroscope 40 can provide information as to motion of the mobile device 12 affecting the orientation. The accelerometer 42 is configured to provide information as to gravitational acceleration such that the direction of gravity relative to the mobile device 12 can be determined. The three-axis magnetometer 44 is configured to provide an indication of the direction, in three dimensions, of magnetic north relative to the mobile device 12, e.g., to a coordinate system of the mobile device 12.

Within the mobile device 12, the orientation sensors 32 comprise a sensor ensemble that collects information relating to the orientation of the mobile device 12. The sensor ensemble is associated with a set of three axes, which respectively correspond to the three spatial dimensions of the mobile device 12. These axes, in turn, define a coordinate plane for the sensor ensemble and its associated mobile device 12. By way of example, a coordinate plane for the mobile device 12 may be defined by three orthogonal axes that respectively run along the length, width and depth of the mobile device 12.

Information obtained by the orientation sensors 32 is provided to orientation analysis module(s) 46 and/or a motion direction tracker module 48 for subsequent processing, as further shown by FIG. 3. The orientation analysis module(s) 46 and the motion direction tracker module 48 are implemented by the processor 20 in conjunction with the software 24 stored in the memory 22. These modules, as implemented by the processor 20 (e.g., by executing software algorithms), are configured to process the information from the orientation sensors 32 in order to determine the direction of motion of the mobile device 12 with respect to the earth, e.g., expressed in relation to north.

The motion direction tracker module 48 can express the direction of motion of the mobile device 12 as an angle relative to north, e.g., with respect to a horizontal plane in an Earth-based coordinate system. As used herein, the term "north" refers to any known definition of north, including true north, magnetic north, etc. In the event that direction of motion of the mobile device 12 is determined with respect to true north, the motion direction tracker module 48 can receive data from the orientation sensor(s) 32, such as a magnetometer 44, relating to motion direction with respect to magnetic north and implement one or more algorithms (e.g., based on magnetic declination and/or other compensating factors) to relate the data to true north.

Movement of the mobile device 12 can in various cases be interpreted as a vector, where the heading of the vector corresponds to the direction of the movement. In some cases, the relative orientation of the vector is assumed constant at a given interval in time with respect to the sensor ensemble of the mobile device 12. The orientation of the vector is calibrated or determined according to various techniques (e.g., utilizing an SPS receiver 30, orientation sensors 32, etc.). Changes to the relative orientation of the sensor ensemble with respect to the earth are tracked, in turn providing tracking of the heading of the vector.

In techniques currently employed for tracking motion of a sensor-equipped device, motion direction is computed and expressed in terms of a reference axis. More particularly, an existing axis in the sensor coordinate frame of the device is selected as a reference axis. The reference axis is then projected onto the horizontal plane in the coordinate plane of Earth, and a scalar angular measurement between the projection of the reference axis and north (which is included in the horizontal plane by definition) is obtained. This scalar measurement is combined with a second scalar angular measurement representing the angle between the projected reference axis and the actual direction of motion of the device with respect to the horizontal plane, referred to as an alignment angle or misalignment angle, to obtain the motion direction of the device with respect to north. However, in the event that the reference axis of the device does not align with the horizontal plane with respect to the earth, projection of the reference axis onto the horizontal plane introduces inaccuracy into the motion direction computation. Further, as the reference axis approaches vertical, the motion direction computation with respect to the projected reference axis becomes unstable. Moreover, the projection of the reference axis onto the horizontal plane is undefined when the reference axis is vertically positioned, which results in a numerical singularity and failure of the motion direction computation. Another currently employed technique for determining motion direction of a device replaces the reference axis with another sensor axis when the original reference axis approaches vertical. However, this adds complexity to the approach and does not mitigate the inaccuracies associated with non-horizontal reference axes as described above.

In contrast to the currently employed approaches described above, the orientation analysis module(s) 46 and motion direction tracker module 48 can compute motion direction of a device relative to north by using a motion direction vector relative to the coordinate system of the device and a coordinate transformation of the device coordinate system to an Earth-based coordinate system. In doing so, the motion direction of the mobile device 12 relative to north can be computed without the use of a reference axis or scalar projections onto the Earth-based coordinate system. Further, as the techniques described herein as performed by the orientation analysis module(s) 46 and the motion direction tracker module 48 do not utilize a reference angle, they do not break up the final direction computation into two angles (e.g., the angle representing the projection of the reference axis with respect to north minus the alignment angle).

The mobile device 12 shown in FIG. 2 includes the gyroscope 40, the accelerometer 42, the magnetometer (or compass) 44, and the SPS receiver 30. Other examples of mobile devices, however, may not include all of these components 40, 42, 44, 30. For example, a mobile device may include the three-dimensional gyroscope 40 only. Alternatively, a mobile device may include the accelerometer 42 and the three-axis magnetometer 44 only. Alternatively still, a mobile device having either the gyroscope 40 or the accelerometer 42 and the compass or magnetometer 44 may include the SPS receiver 30. As yet another alternative, a mobile device may include orientation sensors 32 other than the gyroscope 40, the accelerometer 42, and/or the magnetometer 44 shown by FIG. 3 in addition to, or in place of, the SPS receiver 30.

Referring again to FIG. 3, the orientation sensors 32 provide data to the orientation analysis module(s) 46 and/or the motion direction tracker module 48 in order to enable the direction of motion of mobile device 12 with respect to the earth (e.g., in relation to north) to be determined. Motion direction computation techniques based on data from the orientation sensors 32 can be used in a scenario in which the mobile device 12 does not have satellite navigation capability or the SPS receiver 30 fails or is otherwise unavailable, the signal received by the SPS receiver is noisy or unreliable, etc. Alternatively, these techniques can be utilized in combination with or in place of a functional SPS receiver 30 at the mobile device 12 in order to reduce power consumption associated with the SPS receiver 30. For example, the SPS receiver 30 can be switched off when the motion direction of the mobile device 12 is determined via data from the orientation sensors 32.

The orientation analysis module(s) 46 and motion direction tracker module 48 can operate with the aid of data from the orientation sensors 32 to compute motion direction of the mobile device 12 relative to north by using a motion direction vector relative to the device coordinate system and a coordinate transformation of the device coordinate system to an Earth-based coordinate system. Here, device motion relative to north is determined from the following: Motion direction relative to Earth (C)=device orientation relative to Earth (A) plus motion direction relative to device orientation (B). In this expression, (A) represents a three-dimensional rotation (e.g., realized by a rotation matrix or quaternion). Furthermore, (B) and (C) represent three-dimensional vectors.

Motion direction relative to device orientation can be computed directly or indirectly. In the case of direct computation of the motion direction, orientation analysis module(s) 46 and motion direction tracker module 48 cooperate to determine the motion direction of the mobile device 12 based on data obtained from the orientation sensors 32 without the aid of the SPS receiver 30. Direct motion direction computation converts the orientation of the mobile device 12 into motion direction as described below. Derived motion direction data can be expressed as course over ground, etc., and can be utilized to support or replace dead reckoning techniques and/or other position location techniques.

Direct computation of the direction of a mobile device 12 begins by identifying data from the orientation sensors 32 relating to a vector representing the motion of the mobile device 12, which is expressed in the sensor coordinate frame of the mobile device 12. This vector can be obtained in a variety of ways. For example, if the vector represents direction of motion of a vehicle, pedestrian, etc., it can be provided through eigenvector analysis. The sensor coordinate frame of the mobile device 12 is then determined with respect to the earth, as a rotation matrix or a quaternion. The orientation analysis module(s) 46 can make this determination, for example, based on data received from the orientation sensors 32. Upon translation of the sensor coordinate frame of the mobile device 12 to an Earth-based coordinate frame the original vector is rotated to the Earth-based coordinate frame, from which the direction of motion is computed using the horizontal plane determined by the gravity direction obtained from measurements by the accelerometer(s) 42.

In both the direct and indirect techniques described herein, the motion direction of the mobile device 12 is determined based on a transformation $R_S^E$ between an Earth-based coordinate system and the sensor coordinate system of the mobile device 12 as measured by the orientation sensors 32. For instance, direct computation of motion direction can be performed based on acceleration measurements made in the sensor coordinate system, denoted here as $a_S$. From $a_S$, the orientation analysis module(s) 46 or other suitable mechanisms can transform the acceleration measurements to an Earth-based coordinate system as $a_E = R_S^E a_S$. The motion direction tracker module 48 computes the direction $d_E$ of motion with respect to the earth from accelerations $a_E$ according to $d_E = F\{a_E\}$.

Alternatively, the motion direction tracker module 48 can compute the direction of motion $d_S$ in the sensor frame based on the accelerations $a_S$ in the sensor frame according to $d_S = F\{a_S\}$. Computation of the direction of motion in the Earth-based coordinate system can then be completed by the orientation analysis module(s) 46 or other suitable mechanisms as $d_E = R_S^E d_S$.

Figure 4:
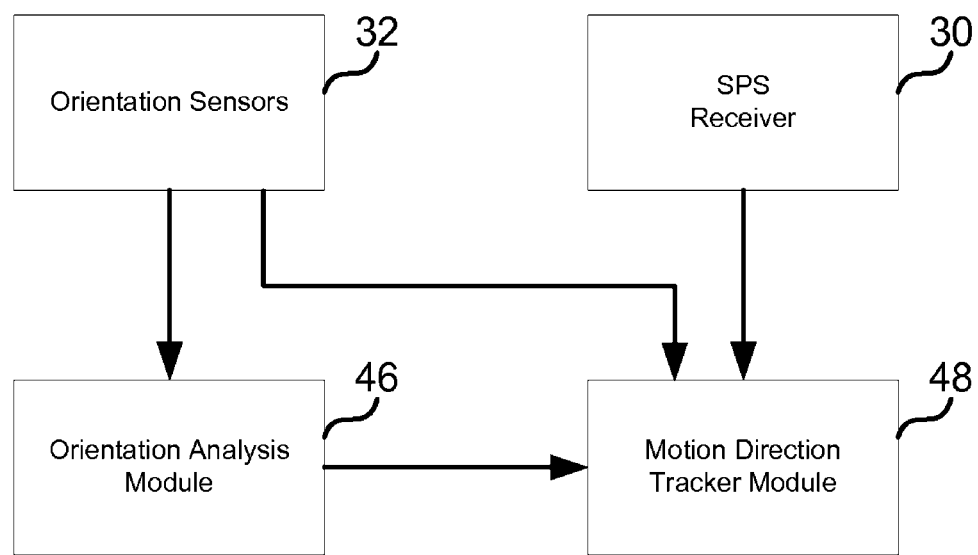
FIG. 4 is a partial functional block diagram of a system for tracking changes to motion direction of a mobile device with respect to the earth independently of a reference axis.

Motion direction of the mobile device 12 can also be computed using an indirect method, as shown by FIG. 4. In the indirect method, the motion direction of the mobile device 12 relative to device orientation is calibrated during an initial calibration period and considered constant afterwards. The orientation of the mobile device 12 relative to Earth is computed by orientation analysis module(s) 46 according to data obtained from the orientation sensors 32. An initial value for the motion direction of the mobile device 12 relative to Earth is obtained from the SPS receiver 30. Then, during a calibration period, the initial motion direction relative to the mobile device is obtained from the initial value for the motion direction of the mobile device 12 relative to Earth and the initial orientation of the mobile device 12 relative to Earth. After calibration, motion direction relative to Earth is obtained by the motion direction tracker module 48 by combining the motion direction relative to the orientation of the mobile device 12 (which is assumed known and constant after calibration) and measurements of the device orientation relative to Earth as obtained by the orientation sensors 32 and processed by the orientation analysis module(s) 46.

With further reference to the indirect method, an initial direction of motion $d_0$ of the mobile device in an Earth-based coordinate system is obtained by the SPS receiver 30. From this, a first rotation $R_D^E$ between the Earth-based coordinate system and $d_0$ and a second rotation $R_D^S = R_E^S R_D^E$ between the sensor coordinate system of the mobile device 12 and $d_0$ are computed. After this calibration phase, the motion direction tracker module 48 continuously determines the third rotation $R_{S0}^E$ between the sensor coordinate system of the mobile device and the Earth-based coordinate system, and utilizes these rotations to compute the direction of motion $d_E$ of the mobile device 12 relative to Earth as $d_E = R_S^E R_D^S d_0$.

Calibration in the indirect motion direction computation techniques described above are performed in three dimensions, such that all three spatial axes of the mobile device 12 are utilized in the calibration process. This is in contrast to previously employed approaches to motion direction computation, where calibration is performed on the horizontal plane only via projection of a reference axis onto the horizontal plane. By calibrating from SPS projections of the velocity vector of the mobile device 12 on all three device axes, calibration is performed with respect to projected components of the velocity vector, reducing the occurrence of instability and inaccuracies associated with techniques in which only one calibration alignment is used.

Figure 5:
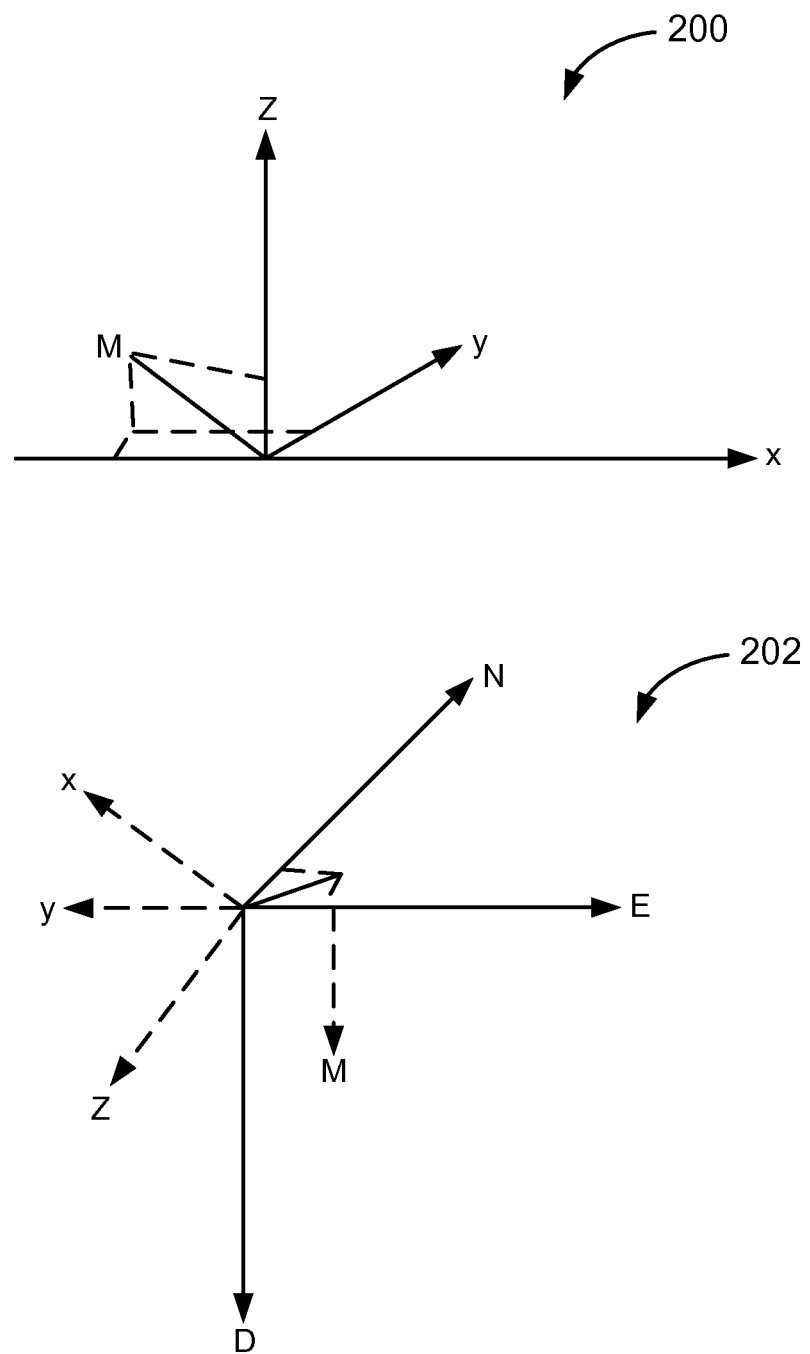
FIG. 5 is a graphical illustration of a technique for relating device motion to a coordinate system of Earth without use of a reference axis.

Referring next to FIG. 5, graphs 200 and 202 illustrate the implementation of the techniques described herein. In graph 200, the direction of motion M is determined relative to the x-y-z coordinate system of the mobile device 12. The orientation of the device relative to the coordinate system of Earth is determined, and a coordinate transformation is computed to orient the x-y-z coordinate system of the mobile device with the n-e-d (north-east-down) coordinate system of Earth, as shown in graph 202. From this, the motion direction is projected onto the north-east plane, and the angle Θ relative to north is computed.

Figure 6:
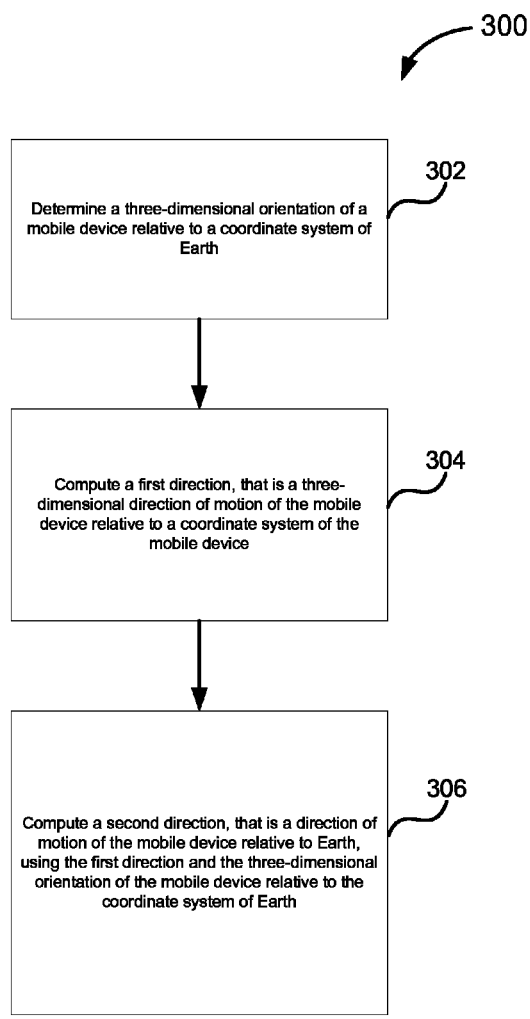
FIG. 6 is a block flow diagram of a process of determining a direction of motion of a mobile device relative to Earth without using a reference axis.

Referring to FIG. 6, with further reference to FIGS. 1-5, a process 300 of determining a direction of motion of a mobile device relative to Earth without using a reference axis includes the stages shown. The process 300 is, however, an example only and not limiting. The process 300 can be altered, e.g., by having stages added, removed, rearranged, combined, and/or performed concurrently. Still other alterations to the process 300 as shown and described are possible.

At stage 302, a three-dimensional orientation of a mobile device 12 relative to a coordinate system of Earth is determined. The orientation of the mobile device 12 can be determined based on measurements obtained from one or more orientation sensors 32, such as a gyroscope 40, an accelerometer 42, a magnetometer 44, or the like. Further, orientation of the mobile device 12 with respect to earth can be determined by one or more orientation analysis modules 46 based on data relating to acceleration of the mobile device 12 relative to a coordinate system of the mobile device 12 and a coordinate transformation to an Earth-based coordinate system.

At stage 304, a first direction, that is a three-dimensional direction of motion of the mobile device 12 relative to a coordinate system of the mobile device 12, is computed. These computations are performed by, e.g., the motion direction tracker module 48 based on information obtained from orientation sensors 32 and/or SPS receiver 30. At stage 306, a second direction, that is a direction of motion of the mobile device 12 relative to Earth, is computed using the first direction, as computed at stage 304, and the three-dimensional orientation of the mobile device 12 relative to the coordinate system of Earth, as determined at stage 302. As discussed above, computation of the second direction at stage 306 is performed using a rotation matrix, a quaternion, or other means without projecting the motion direction of the mobile device with respect to a reference axis to a horizontal plane in the Earth-based coordinate system.

Figure 7:
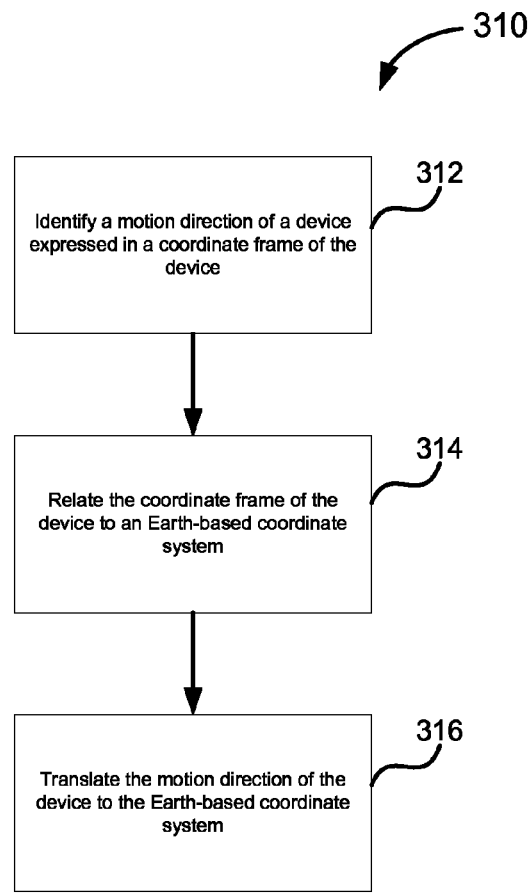
FIG. 7 is a block flow diagram of a process of reference-independent motion direction tracking of a mobile device in an Earth-based coordinate system.

Referring next to FIG. 7, with further reference to FIGS. 1-5, a process 310 of reference-independent motion direction tracking of a mobile device in an Earth-based coordinate system includes the stages shown. The process 310 is, however, an example only and not limiting. The process 310 can be altered, e.g., by having stages added, removed, rearranged, combined, and/or performed concurrently. Still other alterations to the process 310 as shown and described are possible. Using the process 310, the direction of motion of a mobile device 12 is directly computed from sensor data collected from orientation sensors 32 without the aid of a SPS receiver 30.

At stage 312, a motion direction of the mobile device 12 is identified and expressed in a coordinate frame of the mobile device 12. Sensor data at stage 312 are defined in terms of, e.g., the x, y and z sensor axes of the mobile device 12, and may be provided to orientation analysis module(s) 46, implemented via processor 20 and software 24 stored on the memory 22, for some or all of the processing of stage 312. At stage 314, the coordinate frame of the mobile device 12 is related to an Earth-based coordinate system. The Earth-based coordinate system can be a n-e-d coordinate system such as that shown in graph 202 and/or any other suitable coordinate system. At stage 316, the motion direction of the device as identified at stage 312 is translated into the Earth-based coordinate system. Some or all of the processing of stage 316 is performed by a motion direction tracker module 48, which is implemented via a processor 20 executing software 24 stored on a memory 22.

Figure 8:
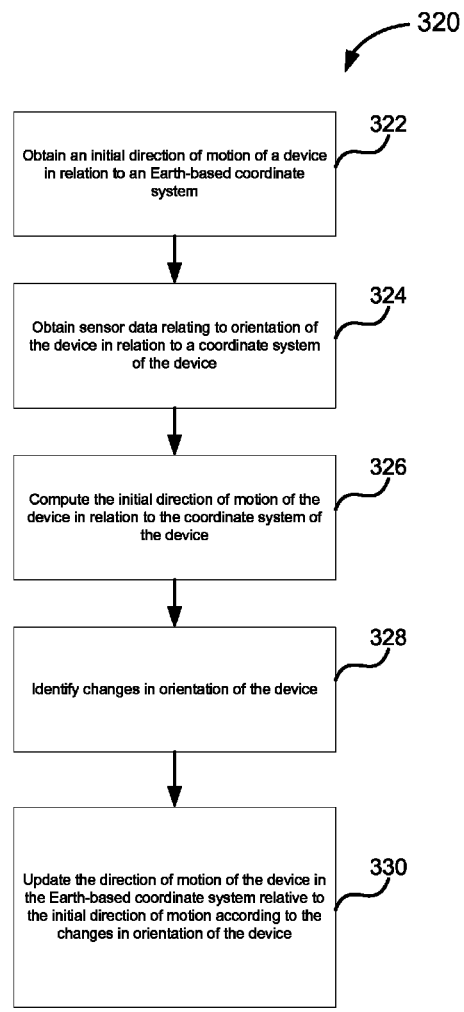
FIG. 8 is a block flow diagram of a process of indirect tracking of motion of a mobile device with respect to earth without use of a reference axis.

Turning to FIG. 8, with further reference to FIGS. 1-5, a process 320 of indirect tracking of motion of a mobile device with respect to earth without use of a reference axis includes the stages shown. The process 320 is, however, an example only and not limiting. The process 320 can be altered, e.g., by having stages added, removed, rearranged, combined, and/or performed concurrently. Still other alterations to the process 320 as shown and described are possible. Using the process 320, the direction of motion of a mobile device 12 is indirectly computed from calibration data obtained from a SPS receiver 30 supplemented by sensor data collected from orientation sensors 32.

At stage 322, an initial direction of motion of the mobile device 12 is obtained, by the SPS receiver 30 and/or any other suitable mechanism(s), in relation to an Earth-based coordinate system. At stage 324, sensor data relating to orientation of the mobile device 12 is obtained in relation to the Earth-based coordinate system. Sensor data are obtained at stage 324 from orientation sensors 32, which may operate to provide sensor data to orientation analysis module(s) 46 implemented via a processor 20 executing software 24 stored on a memory 22 in a similar manner to stage 312 of process 310.

At stage 326, the initial direction of motion of the mobile device 12 is computed in relation to a coordinate system of the mobile device 12. The coordinate system of the mobile device 12 is defined by, e.g., the x, y and z sensor axes of the mobile device 12. The computations of stage 326 are conducted by, e.g., comparing the initial direction of motion of the mobile device 12 obtained at stage 322 with the sensor data obtained at stage 324.

At stage 328, changes in the orientation of the mobile device 12, e.g., relative to the sensor data obtained at stage 324, are identified. At stage 330, the direction of motion of the mobile device 12 in the Earth-based coordinate system is updated relative to the initial direction of motion obtained at stage 322 according to the changes in orientation of the mobile device 12 identified at stage 328. Computation at stage 330 is performed by, e.g., a motion direction tracker module 48 implemented via a processor 20 executing software 24 stored on a non-transitory memory 22.

Still other techniques are possible.

What is claimed is:

1. A system for computing motion direction of a mobile device, the system comprising:
    an orientation sensor configured to collect data relating to orientation of the mobile device;
    an orientation analysis module communicatively coupled to the orientation sensor and configured to determine a three-dimensional orientation of the mobile device relative to an Earth-based coordinate system based on the data collected by the orientation sensor; and
    a motion direction tracker module communicatively coupled to the orientation analysis module, configured to compute a first direction, that is a three-dimensional direction of motion of the mobile device relative to a coordinate system of the mobile device, and configured to compute a second direction, that is a direction of motion of the mobile device relative to the Earth-based coordinate system, based on the first direction using the three-dimensional orientation of the mobile device relative to the Earth-based coordinate system.

2. The system of claim 1 wherein the orientation sensor comprises at least one of an accelerometer, a gyroscope or a magnetometer.

3. The system of claim 1 wherein the orientation sensor is further configured to collect data relating to motion direction of the mobile device and the motion direction tracker module is further configured to determine the first direction based on the data collected by the orientation sensor relating to the motion direction of the mobile device.

4. The system of claim 1 wherein the motion direction tracker module is further configured to relate the coordinate system of the mobile device to the Earth-based coordinate system and to translate the motion direction of the mobile device of the mobile device from the coordinate system of the mobile device to the Earth-based coordinate system.

5. The system of claim 4 wherein the motion direction tracker module is further configured to relate the coordinate system of the mobile device to the Earth-based coordinate system using a rotation matrix or a quatemion.

6. The system of claim 1 wherein the first direction is an angle relative to north in relation to a horizontal plane of the Earth-based coordinate system.

7. The system of claim 6 wherein the first direction is one of an angle relative to magnetic north or an angle relative to true north.

8. The system of claim 6 wherein the motion direction tracker module is further configured to compute the second direction by projecting, to a horizontal plane at Earth's surface, a three-dimensional direction of motion of the mobile device relative to the Earth-based coordinate system determined using a three-dimensional direction of motion of the mobile device relative to the coordinate system of the mobile device and the three-dimensional orientation of the mobile device relative to the Earth-based coordinate system.

9. A system for tracking motion direction of a mobile device, the system comprising:
    an orientation sensor configured to collect data relating to orientation of the mobile device;
    a satellite positioning system (SPS) receiver configured to determine an initial direction of motion of the mobile device in terms of an Earth-based coordinate system during a calibration time period;
    an orientation analysis module communicatively coupled to the orientation sensor and configured to track changes to a three-dimensional orientation of the mobile device in terms of the Earth-based coordinate system over time based on the data collected by the orientation sensor; and
    a motion direction tracker module communicatively coupled to the SPS receiver and the orientation analysis module and configured to compute a direction of motion of the mobile device in terms of the Earth-based coordinate system relative to the initial direction of motion of the mobile device using the changes to the three-dimensional orientation of the mobile device in terms of the Earth-based coordinate system.

10. The system of claim 9 wherein the orientation sensor comprises at least one of an accelerometer, a gyroscope or a magnetometer.

11. The system of claim 9 wherein the motion direction tracker module is further configured to compute the direction of motion of the mobile device as an angle relative to north in relation to a horizontal plane of the Earth-based coordinate system.

12. The system of claim 11 wherein the motion direction tracker module is further configured to compute the direction of motion of the mobile device by projecting, to a horizontal plane at Earth's surface, a three-dimensional direction of motion of the mobile device relative to the Earth-based coordinate system determined using a three-dimensional direction of motion of the mobile device in terms of a coordinate system of the mobile device, the changes to the three-dimensional orientation of the mobile device in terms of the Earth-based coordinate system over time, and the initial direction of motion of the mobile device in terms of the Earth-based coordinate system.

13. A method of computing motion direction of a mobile device comprising:
    determining a three-dimensional orientation of the mobile device relative to a coordinate system of Earth;
    computing a first direction, that is a three-dimensional direction of motion of the mobile device relative to a coordinate system of the mobile device;
    computing a second direction that is a three-dimensional direction of motion of the mobile device relative to the coordinate system of Earth using the first direction and the three-dimensional orientation of the mobile device relative to the coordinate system of Earth, the second direction be an angle relative to north; and
    projecting, to a horizontal plane at Earth's surface, the three-dimensional direction of motion of the mobile device relative to the coordinate system of Earth.

14. A method of tracking a motion direction of a mobile device over time comprising:
    obtaining an initial motion direction of the mobile device in a coordinate system of Earth from a satellite navigation system during an initial time period;
    determining a three-dimensional orientation of the mobile device in the coordinate system of Earth subsequent to the initial time period; and
    computing an updated motion direction of the mobile device in the coordinate system of Earth relative to the initial motion direction of the mobile device using the three-dimensional orientation of the mobile device in the coordinate system of Earth.

15. The method of claim 14 further comprising:
determining an initial three-dimensional orientation of the mobile device in the coordinate system of Earth during the initial time period; and
computing a three-dimensional motion direction of the mobile device in a coordinate system of the mobile device using the initial motion direction of the mobile device in the coordinate system of Earth and the initial three-dimensional orientation of the mobile device in the coordinate system of Earth.

16. The method of claim 14 wherein the computing the updated motion direction of the mobile device comprises:
determining an updated three-dimensional motion direction of the mobile device in the coordinate system of Earth using the three-dimensional motion direction of the mobile device in the coordinate system of the mobile device and the three-dimensional orientation of the mobile device in the coordinate system of Earth subsequent to the initial time period; and
projecting, to a horizontal plane at Earth's surface, the updated three-dimensional motion direction of the mobile device in the coordinate system of Earth.

17. A mobile wireless communication device comprising:
sensing means for generating orientation information for the device;
orientation means, communicatively coupled to the sensing means, for computing a three-dimensional earth-frame orientation of the device relative to Earth based on the orientation information for the device; and
direction means, communicatively coupled to the orientation means, for computing a three-dimensional sensor-frame direction of motion of the device relative to a sensor coordinate plane of the device defined by at least one sensor axis and
computing an earth-frame direction of motion of the device relative to Earth using the three-dimensional sensor-frame direction of motion of the device and the three-dimensional earth-frame orientation of the device.

18. The device of claim 17 wherein the direction means is further configured to translate the three-dimensional sensor-frame direction of motion of the device to a three-dimensional earth-frame direction of motion using a rotation matrix or a quaternion.

19. The device of claim 17 wherein the earth-frame direction of motion of the device is an angle relative to north and the direction means is configured to compute the earth-frame direction of motion of the device by projecting, to a horizontal plane relative to Earth, a three-dimensional earth-plane direction of motion of the device determined using a three-dimensional sensor-plane direction of motion of the device and the three-dimensional earth-plane orientation of the device.

20. A mobile wireless communication device comprising:
sensing means for generating orientation information for the device;
calibration means for determining an initial earth-frame direction of 4 motion of the device relative to Earth;
orientation means, communicatively coupled to the sensing means, for tracking changes to a three-dimensional earth-frame orientation of the device relative to Earth over time based on the orientation information for the device; and
direction means, communicatively coupled to the calibration means and
the orientation means, for computing changes to an earth-frame direction of motion of the device relative to Earth over time relative to the initial earth-frame direction of motion of the device using the changes to the three-dimensional earth-frame orientation of the device.

21. The device of claim 20 wherein the direction means is configured to compute the earth-frame direction of motion of the device as an angle relative to north.

22. The device of claim 21 wherein the direction means is further configured to compute the earth-frame direction of motion of the device by projecting, to a horizontal plane relative to Earth, a three-dimensional earth-frame direction of motion of the device computed using a sensor-frame direction of motion of the device relative to a sensor coordinate plane of the device defined by at least one sensor axis, the changes to the three-dimensional earth-frame orientation of the device, and the initial earth-frame direction of motion of the device.

23. A non-transitory processor-readable medium comprising processor-readable instructions configured to cause a processor to:
determine a three-dimensional orientation of a mobile device relative to a coordinate system of Earth;
compute a first direction, that is a three-dimensional direction of motion of the mobile device relative to a coordinate system of the mobile device; and
compute a second direction that is a three-dimensional direction of motion of the mobile device relative to the coordinate system of Earth using the first direction and the three-dimensional orientation of the mobile device relative to the coordinate system of Earth, the second direction being an angle relative to north; and
project, to a horizontal plane at Earth's surface, the three-dimensional direction of motion of the mobile device relative to the coordinate system of Earth.

24. A non-transitory processor-readable medium comprising processor-readable instructions configured to cause a processor to:
obtain an initial motion direction of a mobile device in a coordinate system of Earth from a satellite navigation system during an initial time period;
determine a three-dimensional orientation of the mobile device in the coordinate system of Earth subsequent to the initial time period; and
compute an updated motion direction of the mobile device in the coordinate system of Earth relative to the initial motion direction of the mobile device using the three-dimensional orientation of the mobile device in the coordinate system of Earth.

25. The non-transitory processor-readable medium of claim 24 further comprising processor-readable instructions configured to cause the processor to:
determine an initial three-dimensional orientation of the mobile device in the coordinate system of Earth during the initial time period; and
compute a three-dimensional motion direction of the mobile device in a coordinate system of the mobile device using the initial motion direction of the mobile device in the coordinate system of Earth and the initial three-dimensional orientation of the mobile device in the coordinate system of Earth.

26. The non-transitory processor-readable medium of claim 24 wherein the instructions configured to cause the processor to compute the updated motion direction of the mobile device are further configured to cause the processor to:
determine an updated three-dimensional motion direction of the mobile device in the coordinate system of Earth using a three-dimensional motion direction of the mobile device in a coordinate system of the mobile device and the three-dimensional orientation of the mobile device in the coordinate system of Earth subsequent to the initial time period; and project, to a horizontal plane at Earth's surface, the updated three-dimensional motion direction of the mobile device in the coordinate system of Earth.

\* \* \* \* \*